2,702,201

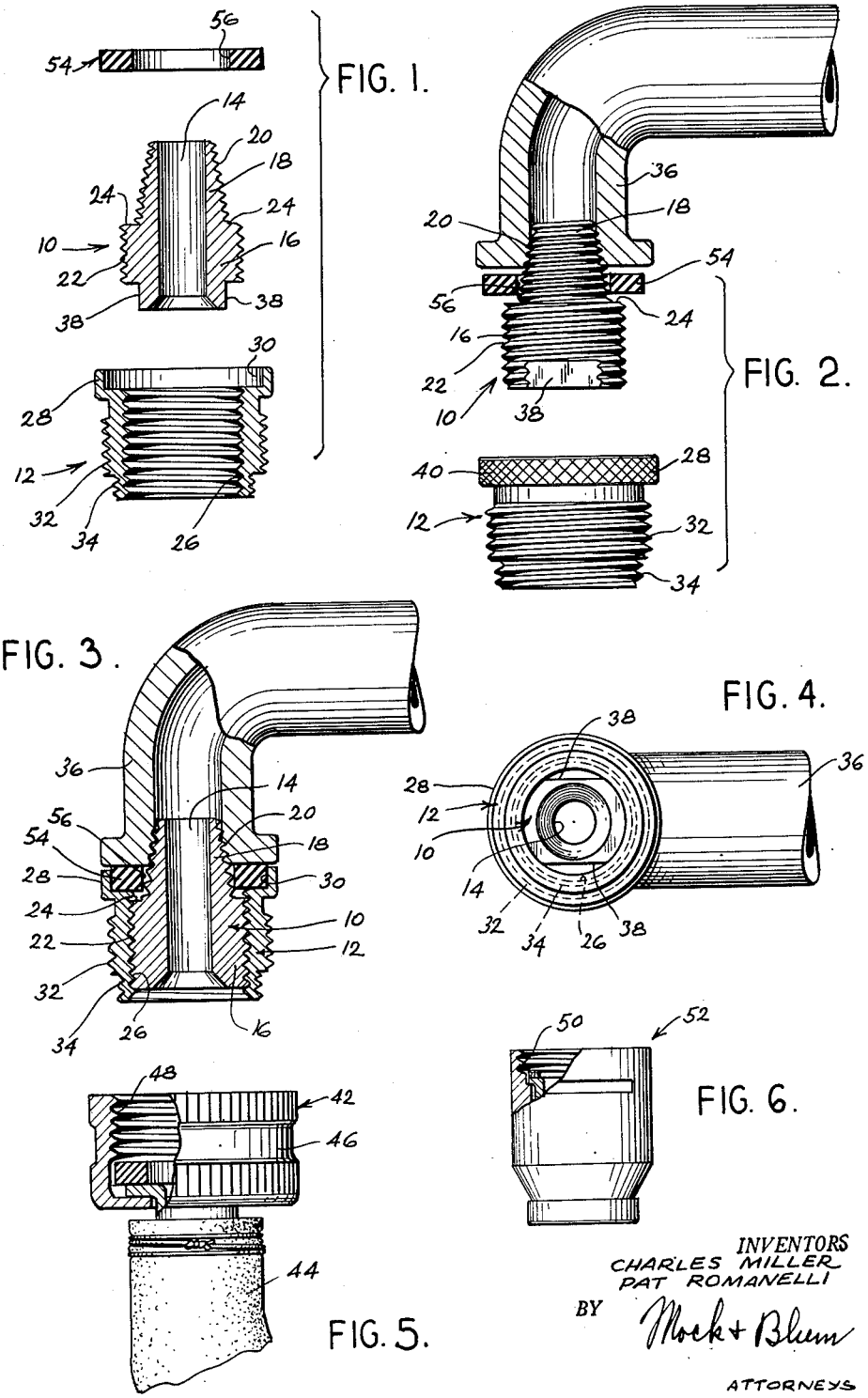

HOSE ADAPTER COUPLING FOR FAUCET SPIGOTS

Pat Romanelli and Charles Miller, New York, N. Y., assignors to Ram Domestic Products Company, Englewood, N. J., a partnership Application September 24, 1952, Serial No. 311,244

3 Claims. (Cl. 285—160)

The present invention relates to improvements in conduit couplings and has particular reference to a coupling for connecting a flexible hose or pipe to a faucet spigot.

It has been found desirable to attach the water inlet hose or pipe of pressure-type kitchen appliances such as clothes-washing machines, dish washers, and the like directly to kitchen faucets, and in particular to the common swing spout of kitchen sinks. Thus water may be supplied to the appliance without the necessity of installing expensive separate plumbing systems. Because most faucet spouts vary in diameter and are not provided with threading, it has heretofore been found impractical to provide screw-type couplings for connecting flexible pipes thereto. Couplings of this type have therefore been made with snap-on or frictional retaining means but have been found dis-advantageous since a water-tight seal is difficult to obtain by this system. In addition, the back pressure produced by appliances such as washing machines often creates sufficient back-lash to blow the coupling violently off the faucet.

It is an object of the present invention to provide a coupling unit adapted to be threadedly engaged rigidly and securely to faucets of different mouth diameters.

Another object of the invention is the provision of a coupling unit of the type described which has means for providing a water-tight seal around the faucet mouth after the unit is threadedly secured.

Still another object of the invention is the provision of a coupling unit of the type described which is adapted to receive hose couplings of varying diameter.

A further object of the invention is the provision of a coupling unit of the type described which may be left attached to the faucet when not in use without interfering with the normal operation of the faucet and which is further adapted to receive a water aerator or the like for supplying a steady, even stream of water.

Other objects and advantages of the invention will be apparent in the course of the following specification when taken in connection with the accompanying drawings in which:

Fig. 1 is an exploded vertical sectional view of the component parts of the coupling unit;

Fig. 2 is an elevation showing the manner in which the coupling unit is attached to a faucet spigot;

Fig. 3 is a sectional view showing the coupling unit attached to the faucet spigot.

Fig. 4 is a bottom plan view of the coupling unit in its position of Fig. 3;

Fig. 5 is an elevation partially in section of a hose coupling adapted to be attached to the coupling unit; and Fig. 6 is an elevational view of a water aerator adapted to be attached to the coupling unit, with a portion thereof shown in section.

Referring in detail to the drawings, the invention consists of a coupling unit comprising a metallic insert 10 and a metallic sleeve 12 sized to receive said insert.

The coupling insert 10 has a central through-and-through longitudinal bore 14 which extends through a lower cylindrical portion 16 and a contiguous upper frusto-conical portion 18. The frusto-conical portion 18 is provided throughout its length with an outer continuous spiral threading 20 which, because of the shape of the portion 18 has a constantly decreasing diameter as it approaches the top of the insert 10. The lower cylindrical portion 16 is also provided with continuous spiral outer threading 22 throughout its length. Said cylindrical portion 16 has a larger over-all diameter than the base diameter of the frusto-conical portion 18, so that a transverse peripheral shoulder 24 is defined at the junction of these two portions 16 and 18.

The coupling sleeve 12 is hollow and generally cylindrical, having a central bore sized to receive the cylindrical portion 16 of insert 10. This central bore is tapped to provide continuous internal threading 26 which matches the threading 22 of the cylindrical insert portion 16 so that the insert 10 may be turned into and out of the sleeve 12.

The sleeve 12 at its top end has an upstanding annular peripheral flange 28 of greater diameter than the external diameter of said sleeve 12, and forming a circular recessed well 30 in the top surface of sleeve 12. A flat annular washer 54 of resilient and compressible material such as rubber is sized and shaped to fit snugly within the well 30. The washer 32 has a central circular opening 56 sized to fit snugly around the base of the frusto-conical insert portion 18, but smaller in diameter than the annular insert shoulder 24.

The outer periphery of the sleeve 12 is stepped to provide two or more areas of different diameters. Each of these areas contain external threading 32 and 34. These threaded areas provide means for the attachment of various types of hose couplings or the like, as will be presently described.

Fig. 2 shows the manner in which the insert 10 is secured to an ordinary faucet spigot 36 by screwing the frusto-conical insert portion 18 within the mouth of said spigot. Because of its varying diameter, the portion 18 will fit the mouth diameter of any conventional spigot a portion of its threading 20 conforming in size to the spigot mouth and being self-tapping within said mouth when it is turned therein. For the latter purpose the lower end of the cylindrical portion 16 may be cut away at both sides to provide a pair of diametrically-opposed, recessed, planar gripping surfaces 38 for accommodating a tool such as a wrench, pliers, or the like. The insert 10 may be thus rigidly and securely coupled to the faucet.

As shown in Fig. 2, before the insert 10 is secured within the spigot mouth, the washer 54 is first placed upon the frusto-conical portion 18, so that when the insert 10 is secured to spigot 36, the washer 54 is resting on said portion 18 above shoulder 24. The sleeve 12 is then coupled to the bottom of the cylindrical insert portion 16 and turned so that it travels upwardly, its internal threading 26 engaging the external threading 22 of said portion 16.

The sleeve 12 is continued to be turned upwardly until the resilient washer 54 enters the recessed well 30 at the top of sleeve 12, and upon continued rotation of the latter, the bottom surface of said well 30 presses the washer 54 into firm engagement with the bottom surface of the mouth of spigot 36, as shown in Fig. 3. This compression causes the resilient washer 54 to expand and thus provide a watertight seal around the mouth of spigot 36 and the outer surface of the insert portion 18.

To enable the sleeve 12 to be turned tightly against the washer 32, the outer surface of the upstanding flange 28 is preferably serrated or knurled, as shown at 40 in Fig. 2, to provide a firm finger grip.

The drawings are substantially to scale and reference is made thereto for further disclosure.

Fig. 5 shows a conventional hose coupling 42 secured to the end of a flexible hose 44 which may be the inlet pipe of a washing machine or the like. The hose coupling 42 has a rotatable outer coupling member 46 which is internally threaded, the threading 48 matching the outer threading 32 of sleeve 12 for attachment of the latter to the hose coupling 42. Such hose couplings are usually made in two standard sizes, the threaded portion 34 of sleeve 12 being sized to accommodate the other size coupling. The threaded portion 34 also sized to receive the threaded end 50 of a water aerator 52 shown in Fig. 6. Thus the coupling unit, once atached to a sink faucet spigot, need not be removed, but may be fitted with the water aerator 52 for providing an even and steady stream of water in the sink.

While a preferred embodiment of the invention has been shown and described herein, it is obvious that numerous additions, changes, and omissions may be made in the invention without departing from the spirit and scope thereof.

We claim:

1. A coupling unit for attaching a flexible pipe coupling to a faucet spigot, said coupling unit comprising an insert member, an adapter sleeve, and a resilient washer, said insert member having a through-and-through central longitudinal bore, an externally-threaded cylindrical lower portion, and frusto-conical upper portion axially alined and integral with said lower portion, said frusto-conical upper portion having a constantly decreasing diameter from its base to its top end and bearing continuous external threading along its entire length and being sized to fit within the mouth of the faucet spigot with a portion of said threading engaging the wall of said spigot mouth and being self-tapping therein, said cylindrical lower portion having a greater diameter than the base of said upper portion and defining a transverse annular shoulder at the juncture of said portions, said adapter sleeve having internal threading which matches the external threading of said lower insert portion for turnable advancement of said sleeve upwardly over said insert member, said sleeve also having an annular flange upstanding from its top surface, said washer being sized to fit snugly within said annular flange, said washer having a circular opening of greater diameter than said base and of lesser diameter than said shoulder, said sleeve being externally threaded to receive the pipe coupling and being of greater length than said lower insert portion to project at its lower end below the lower free end of the lower insert portion whereby the lower end of the sleeve can engage a washer within the pipe coupling which is threaded onto the sleeve.

2. A coupling unit for attaching a flexible pipe coupling to a faucet spigot, said coupling unit comprising an insert member, an adapter sleeve, and a resilient washer, said insert member having a through-and-through central longitudinal bore, a cylindrical lower portion, and a frusto-conical upper portion axially alined and integral with said lower portion, said upper and lower portions bearing respective continuous external threading along their entire lengths, said frusto-conical upper portion having a constantly decreasing diameter from its base to its top end, said cylindrical lower portion having a greater diameter than the base of said upper portion and defining a transverse annular shoulder at the juncture of said portions, said frusto-conical insert portion being sized to fit within the mouth of said faucet spigot with a portion of its threading engaging the wall of said spigot mouth and being self-tapping therein, said resilient washer being sized to encircle a portion of said frusto-conical insert portion between its top end and said shoulder, said adapter sleeve bearing internal threading engageable with the threading of said cylindrical insert portion for advancement upwardly theeron, said sleeve having an upper surface sized and positioned to contact said washer and compress said washer against the mouth of said spigot when said sleeve is advanced upwardly over said insert, said sleeve being of greater length than said lower insert portion and being externally threaded to receive said pipe coupling.

3. A coupling unit according to claim 2, in which said sleeve has a plurality of externally threaded portions of different diameters.

References Cited in the file of this patent

UNITED STATES PATENTS

| 1,278,651 | Heymann | Sept. 10, 1918 |
| 1,868,798 | Kass | July 26, 1932 |
| 2,373,253 | Martin | Apr. 10, 1945 |
| 2,523,585 | Mueller et al. | Sept. 26, 1950 |

FOREIGN PATENTS

| 8,787 | Great Britain | June 18, 1887 |
| 699,057 | Germany | Nov. 21, 1940 |